United States Patent
Dang et al.

(10) Patent No.: US 7,853,726 B2
(45) Date of Patent: Dec. 14, 2010

(54) FCP COMMAND-DATA MATCHING FOR WRITE OPERATIONS

(75) Inventors: Dung Ngoc Dang, Merritt Island, FL (US); Chung Man Fung, San Francisco, CA (US); Steven Edward Klein, Tucson, AZ (US); Patricia Ching Lu, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/245,942

(22) Filed: Oct. 6, 2008

(65) Prior Publication Data

US 2010/0088434 A1 Apr. 8, 2010

(51) Int. Cl.
    *G06F 13/14* (2006.01)
(52) U.S. Cl. .......................... 710/5; 710/29
(58) Field of Classification Search .................. None
    See application file for complete search history.

(56) References Cited

U.S. PATENT DOCUMENTS

| | | | |
|---|---|---|---|
| 6,298,398 B1 * | 10/2001 | Elliott et al. ................... 710/30 |
| 6,356,944 B1 | 3/2002 | McCarty |
| 6,434,630 B1 * | 8/2002 | Micalizzi et al. ............... 710/5 |
| 6,591,310 B1 * | 7/2003 | Johnson ......................... 710/3 |
| 6,829,659 B2 * | 12/2004 | Beardsley et al. ............. 710/19 |
| 7,152,129 B2 * | 12/2006 | Muro ........................... 710/305 |
| 7,167,929 B2 * | 1/2007 | Steinmetz et al. .............. 710/5 |
| 7,206,288 B2 | 4/2007 | Cometto et al. |
| 7,535,913 B2 * | 5/2009 | Minami et al. ............... 370/401 |
| 7,558,264 B1 * | 7/2009 | Lolayekar et al. ........... 370/392 |
| 7,630,369 B1 * | 12/2009 | Overby et al. ................ 370/389 |
| 7,711,805 B1 * | 5/2010 | Dale ............................ 709/223 |
| 2005/0114358 A1 | 5/2005 | Chen et al. |

OTHER PUBLICATIONS

Nordstrom, GM, "Hardware Assignment of Fibre Channel Exchange Identifiers in Microprogrammed N_Port", IBM Technical Disclosure Bulletin, v38 n11, p. 517-520, Nov. 1995.

* cited by examiner

*Primary Examiner*—Cheng-Yuan Tseng
(74) *Attorney, Agent, or Firm*—Griffiths & Seaton PLLC

(57) ABSTRACT

A method for performing a data exchange between an initiator and a receiver in a fiber channel protocol (FCP) is provided. A control flag is set in a write command to indicate the presence of an identifier. The identifier is copied into a command descriptor block (CDB) of the write command and appended to a data frame. The write command and data frame, including the identifier, is sent from the initiator to the receiver.

11 Claims, 2 Drawing Sheets

FCP COMMAND-DATA MATCHING FOR WRITE OPERATIONS

BACKGROUND OF THE INVENTION

1. Technical Field

The present invention relates in general to computers, and more particularly to a method, system, and computer program product for validating data exchanges between an initiator and a receiver in a fibre channel protocol (FCP).

2. Description of Related Art

Fibre Channel, or FC, is a gigabit-speed network technology primarily used for storage networking. Fibre channel is standardized in the T11 Technical Committee of the InterNational Committee for Information Technology Standards (INCITS), an American National Standards Institute (ANSI)-accredited standards committee. Use of fibre channel began primarily in the supercomputer field. However, fibre channel has become the standard connection type for storage area networks (SANs) in enterprise storage systems. Despite common connotations of its name, fibre channel signaling may operate over both twisted pair copper wire and fiber optic cables.

Fibre Channel Protocol (FCP) is a transport protocol, similar to Transport Control Protocol (TCP) used in Internet Protocol (IP) networks. FCP predominantly transports Small Computer System Interface (SCSI) commands over fibre channel networks. During FCP operations where data is exchanged between an initiator and a receiver, such as a write operation, conditions may occur that cause this data to be associated with an incorrect write command received either prior or subsequent to, the correct write command. These conditions may lead to data integrity errors.

A known solution to these conditions has been to implement a long timeout value as dictated by the Fibre Channel standards described above. Following the timeout, an explicit logout with the receiver is performed if the exchange is not properly aborted. This solution, along with additional known solutions, may tie up computing resources (such as during the timeout period), add complexity, or present incompatibilities in the system.

SUMMARY OF THE INVENTION

In light of the foregoing, a need exists for a mechanism to perform exchanges where data may be correctly and consistently associated with the appropriate command, but without the addition of complexity, resource consumption, or incompatibilities. Accordingly, in one embodiment, by way of example only, a method for performing a data exchange between an initiator and a receiver in a fibre channel protocol (FCP) is provided. A control flag is set in a write command to indicate the presence of an identifier. The identifier is copied into a command descriptor block (CDB) of the write command. The identifier is appended to a data frame. The write command and data frame, each including the identifier, is sent from the initiator to the receiver.

In an additional embodiment, again by way of example only, a system for performing a data exchange in a fibre channel protocol (FCP) is provided. An initiator controller is in communication with a receiver controller. The initiator controller is adapted for setting a control flag in a write command to indicate the presence of an identifier, copying the identifier into a command descriptor block (CDB) of the write command, appending the identifier to a data frame, and sending the write command and data frame, each including the identifier, from the initiator to the receiver.

In an additional embodiment, again by way of example only, a computer program product for performing a data exchange in a fibre channel protocol (FCP) is provided. The computer program product comprises a computer-readable storage medium having computer-readable program code portions stored therein. The computer-readable program code portions comprise a first executable portion for setting a control flag in a write command to indicate the presence of an identifier, a second executable portion for copying the identifier into a command descriptor block (CDB) of the write command, a third executable portion for appending the identifier to a data frame, and a fourth executable portion for sending the write command and data frame, each including the identifier, from the initiator to the receiver.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
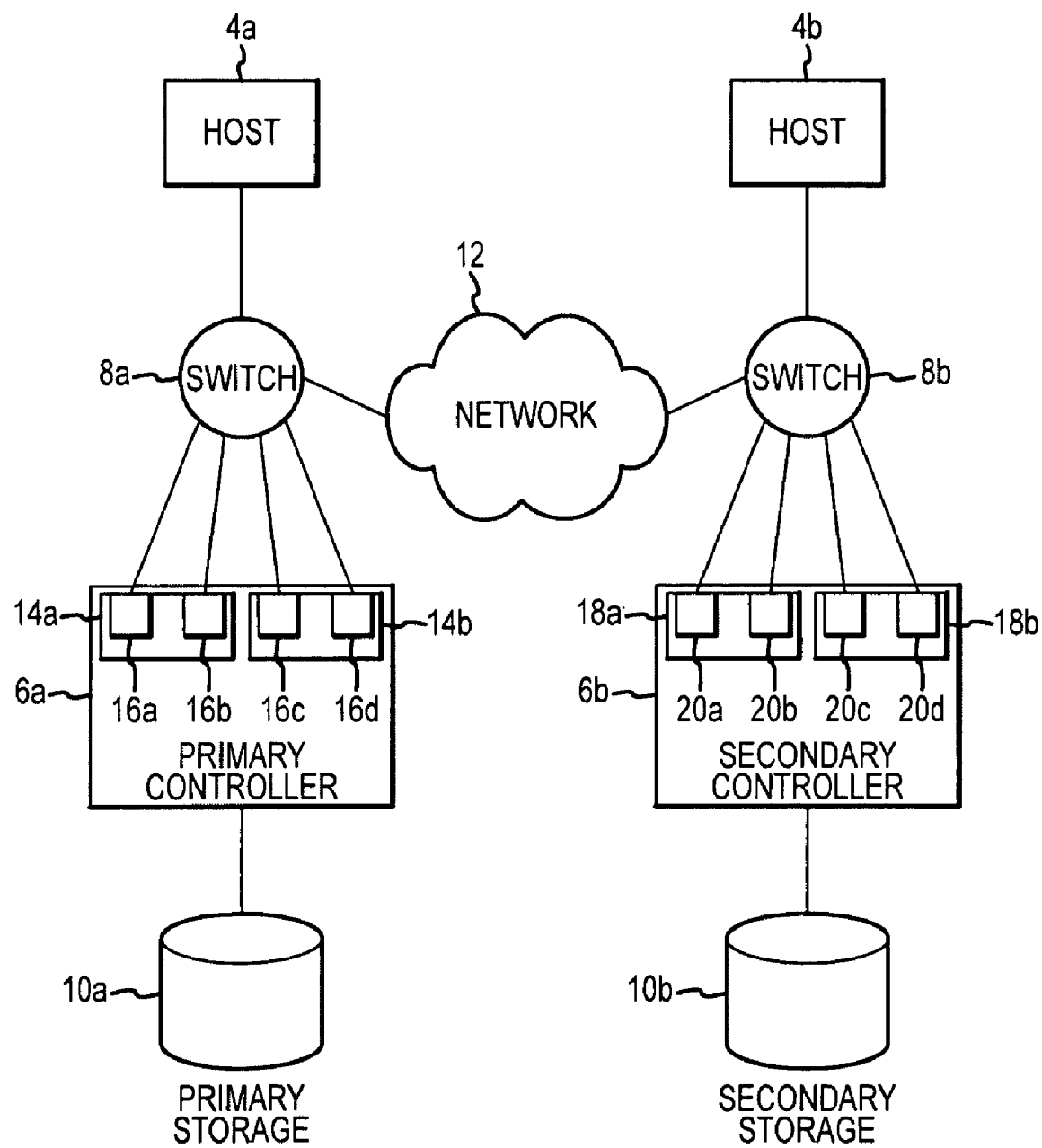
FIG. 1 is an exemplary computing environment in which various aspects of the following description and claimed subject matter may be implemented.

In the fibre channel protocol (FCP), an exchange is identified by several factors, including sender and destination identification (s_id/d_id) and originator and responder exchange identifications (ox_id/rx_id). The ox_id is assigned by the originator to identify exchanges it has originated (such as the initiator of an FCP write command), whereas the rx_id is assigned by the responder to identify exchanges which it is responding to (such as the target of an FCP write command). Until rx_id is assigned, the hexadecimal value of FFFFh is used to indicate an unassigned rx_id. In that case, a responder will use the s_id and ox_id to uniquely identify an exchange. An example of this is when an initiator sends a WRITE command to a target with ox_id/rx_id of 1111/FFFF. If write xfr_rdy is disabled, the initiator would send data to the target with 1111/FFFF. In this case, the target must use the initiator's s_id along with ox_id of 1111 to identify which exchange should receive the write data.

During FCP write operations, conditions can occur that cause the data for an exchange to be associated with the incorrect write command. For example, a write command with ox_id 1111 could be received by a target, and due to link problems or fabric congestion, the data is not received. The initiator may time out and abort that write command, but the abort could also be lost in the SAN and not received by the target. This could cause the condition where a write exchange associated with ox_id 1111 remains open on the target, waiting for data.

If the initiator then reuses ox_id 1111 for another write command to the same target, then sends data for the second write command (each data frame containing ox_id 1111), the target may associate that data with the first write command, since both write commands use the same ox_id. Upon receiving data for the second write command, the target could match the ox_id 1111 with the incorrect write command, sending data to the incorrect destination within the control unit and causing an undetected data integrity error.

One solution to the above problem is for the initiator to wait a long timeout value (for example, 2* R_A_TOV or 20 seconds), and then perform explicit logout with the target if the exchange is not properly aborted. The nature of the fibre channel logout function guarantees that all exchanges from that particular initiator are aborted on the target device. This solution is proposed by the FCP standards. This solution contains drawbacks, however, in that it requires an extended timeout period followed by logout. The timeout can impact performance, and furthermore, the logout is disruptive to all I/O in progress between that initiator and target, on all logical unit numbers (LUNs). In certain environments such as peer-to-peer redundant copy (PPRC), this can also impact the host system by causing exorbitant redrives for all input/outputs (I/Os) that are aborted by the logout. These drawbacks can make the standard solution undesirable to implement.

When a timeout condition in the standardized solution described above occurs, the resources associated with that exchange will be tied up for 20 seconds, which presents an additional drawback. This could prevent any further useful work on fibre channel port(s) involved in the timeouts until the timeouts complete, since every task (such as host FCP command) normally requires an exchange resource.

Another solution to the problem described above is for the target to scan all existing open exchanges upon receiving a new command, in order to discover if the same s_id/ox_id is already in use. Fibre channel has 64K possible ox_ids, and some storage control units allow up to 512 host logins per port, for a possible 64K*512=33 million+ exchanges. Such scanning of existing exchanges during goodpath I/O could have potentially severe performance implications.

Another solution is to use the T10 Data Integrity Field (DIF) standard to associate the data in each logical block with protection information. This solution has the drawback of requiring a logical unit to be formatted with protection data, which is unacceptable for existing logical units. This solution also has the drawback that it cannot be used with PPRC for CKD volumes.

Still another solution is to use sequence numbers at the driver level on every SCSI write command, and if a command is aborted, to not send any more commands to the target until a handshaking is performed at the application level. This solution would solve the problem, but requires stopping all I/O on all paths to the target storage unit until the handshaking is completed. A sequence numbering solution is also more complex.

A potentially more viable solution implements a requirement that the data exchange be fully contained in the transport layer in a single path, which can guarantee the data for an exchange is associated with a particular command. The solution should be simple to implement (including low processing overhead), must be as non-disruptive as possible, and must be usable with PPRC on both Open Systems or CKD volumes.

The following description and claimed subject matter present a mechanism for guaranteeing that data for an exchange is associated with a particular command. The mechanism provides a simple, non-disruptive, and compatible approach to the problems identified above.

The illustrated embodiments below add a unique (for a given period of time) identifier inside the SCSI extended command descriptor block (CDB) and append a matching identifier to the write data. The identifier is used to make sure the correct data is being received for a particular command. A mechanism is provided for the initiator to tell the target that the identifier is appended to the data. Before committing the data to cache, the target can use this information to verify that the identifier appended to the data matches the identifier in the command. The target will reject a write command where the identifiers do not match.

The illustrated embodiments present several advantages over other solutions. For example, the illustrated embodiments are less disruptive to other operations on the path having the problem (either performance-wise or by aborting other tasks due to logout). In addition, the illustrated embodiments do not affect I/O on other paths (as with the sequence numbering solution described above). Finally, the illustrated embodiments also have the advantage of simple implementation.

FIG. 1 illustrates a computing environment in which various aspects of the following description and claimed subject matter may be implemented. Hosts 4a, b may comprise any computing device known in the art, including servers through which other client computers can access storage or clients. The hosts 4a, b each include at least one adaptor, such as a Fibre Channel, SCSI adaptor card, or any other network adaptor card known in the art. The host adaptors allow the hosts 4a, b to communicate with storage controllers 6a, b via switches 8a, b. The switches 8a, b may comprise the International Business Machines Corporation (IBM®) Fibre Channel Storage Hub or Switch, the IBM® SAN Fibre Channel Switch, or any other switching device known in the art. Each switch 8a, b has a port connecting to a network 12, which may comprise any local area network, wide area network, the Internet or any other network system. The network 12 may use routers and switches to dynamically determine the data path through the network 12.

In the described implementations, a primary controller 6a includes interface cards 14a and b having ports 16a, b, c, d and a secondary controller 6b includes interface cards 18a and b having ports 20a, b, c, d. Primary controller 6a would communicate with the secondary controller 6b via one of the ports 16a, b, c, d, switch 8a, the network 12, switch 8b, and then one of the ports 20a, b, c, d on the secondary controller 6b. Thus, the primary controller 6a can select one of sixteen I/O paths to communicate with the secondary controller 6b, i.e., one of the ports 16a, b, c, d paired with one of the ports 20a, b, c, d. In alternative embodiments, each of the controllers 6a, b may include a different number of interface cards having a different number of ports to provide more or less communication paths therebetween.

The secondary storage 10b maintains a mirror copy of specified data volumes in the primary storage 10a. During an establishment phase, a relationship is established between primary volumes in the primary storage 10a and corresponding secondary volumes in the secondary storage 10b that mirror the primary volumes. After this relationship is established, the primary controller 6a will write any updates from hosts 4a, b to primary volumes to the secondary controller 6b to write to the secondary volumes in the secondary storage 10b.

The primary and secondary controllers 6a, b may include IBM® Peer-to-Peer Remote Copy (PPRC), Extended Remote Copy (XRC) software, or other vender shadowing software to allow communication between the controllers 6a, b to coordinate data shadowing. In such embodiments, the controllers 6a, b may comprise large scale storage controllers, such as the IBM® 3990 and Enterprise Storage System class controllers. In open system embodiments, the primary and secondary controllers 6a, b may comprise controllers from different vendors of different models, etc., and may not include any specialized protocol software for performing the backup operations. Further, the controllers may include any operating system known in the art, including the Microsoft® Corporation Windows® operating systems.

In open systems embodiments, the primary controller 6a can use commonly used write commands, such as SCSI write commands, to copy the primary volumes to the secondary volumes in the secondary storage 10b. In such open system embodiments, the secondary controller 6b does not need special purpose software to coordinate the shadowing activities with the primary controller 6b as the primary controller 6a accomplishes the shadowing by using standard write commands. Further, in such open systems, the primary and secondary controllers 6a, b may comprise any controller device known in the art and the primary and secondary controllers 6a, b may be of different models and model types, and even of different classes of storage controllers.

To implement the mechanism described above, and in view of the computing environment presented in FIG. 1, the host adapter associated with primary controller 6a may be instructed by the application level to send a write command to the host adapter associated with secondary controller 6b. The host adapter associated with the primary controller 6a then sets a control flag in the write command to indicate that the command and data contain a special task identifier. The host adapter associated with the primary controller 6a then copies the identifier into both the SCSI CDB and appends the same identifier to the end of the respective data frame. The host adapter then sends the write command and data (including the identifier as part of the data) over network 12 and switch 8b to the secondary controller 6b.

The host adapter associated with secondary controller 6b receives the write command. The host adapter associated with secondary controller 6b then checks for the control flag to indicate that the command and data contain the special identifier, and determines the control flag is set. The secondary controller 6b host adapter then compares the identifier in the SCSI CDB with the identifier appended at the end of the respective data frame. If the two identifiers match, the data is sent to cache, and good status notification is returned to primary controller 6a. If the two identifiers do not match, a SCSI Check Condition is returned to the primary controller 6a to indicate failure.

The identifier described above may vary according to a particular implementation. For example, in embodiments where the primary and secondary controllers are cooperative entities, information known to the secondary controller may be utilized. In one embodiment the identifier may include a logical block address (LBA), volume identification (volume ID), and/or track identification (track ID) information. Finally, the identifier may include a counter or count mechanism.

In some cases, the host adapter associated with the primary controller 6a may set the control flag, but the host adapter associated with the secondary controller 6a may not have the appropriate code to check the flag. In this case, the secondary controller 6a host adapter will only direct memory access (DMA) the amount of data to cache that is referenced in the SCSI CDB (this data size does not include the size of the identifier).

Figure 2:
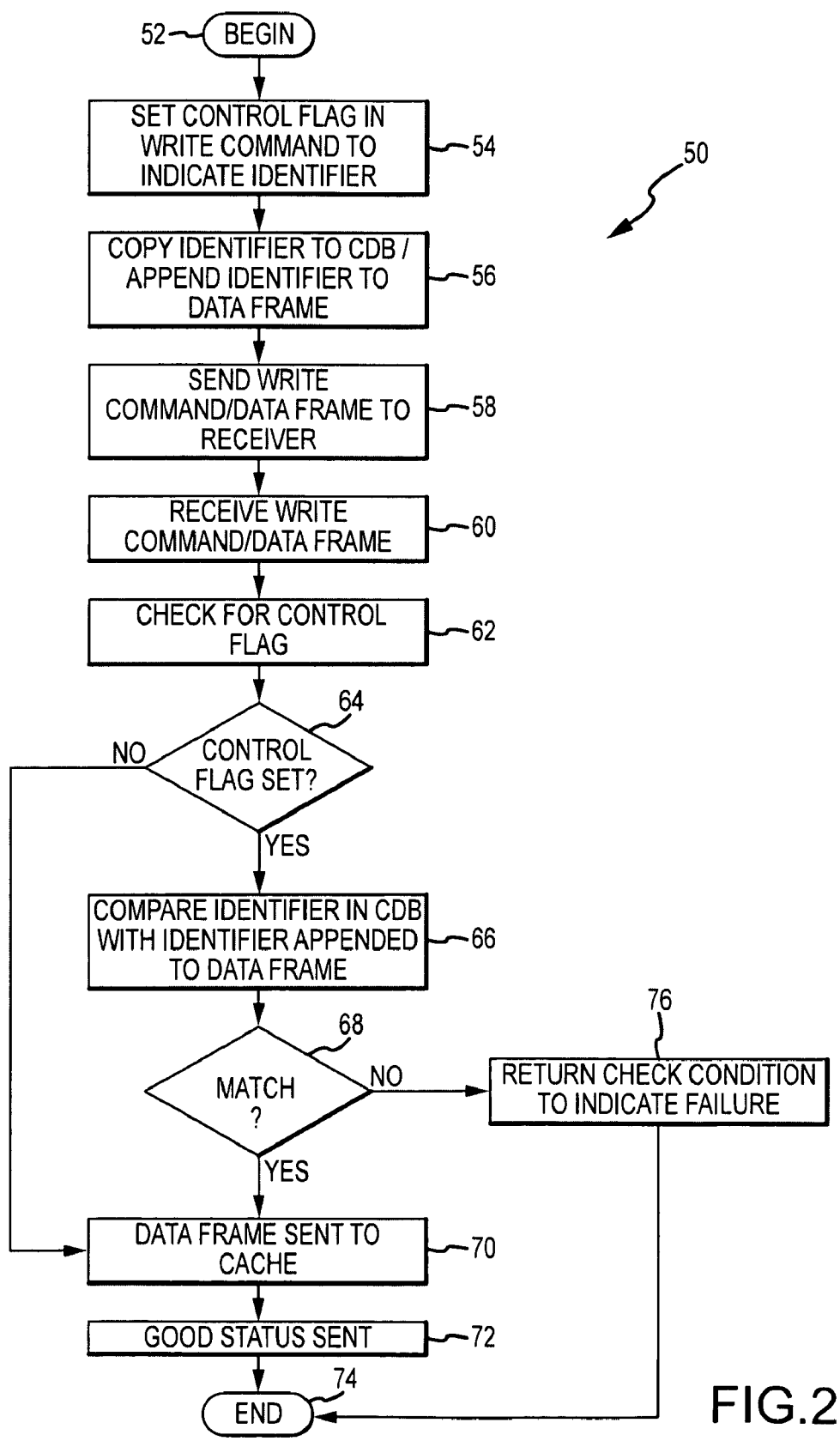
FIG. 2 is a flow chart diagram of an exemplary method for exchanging data between an initiator and a receiver in a fibre channel protocol (FCP).

FIG. 2, following, is a flow chart diagram of an exemplary method 50 for exchanging data between an initiator and a receiver (originator and responder) in fibre channel protocol. As one skilled in the art will appreciate, various steps in the method 50 may be implemented in differing ways to suit a particular application. In addition, the described method may be implemented by various means, such as hardware, software, firmware, or a combination thereof operational on or otherwise associated with the blade server environment. For example, the method 50 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 50 begins (step 52) with the setting of a control flag in the write command to indicate the presence of the identifier (step 54). The identifier is both copied to the CDB and appended to the data frame as previously described (step 56). The write command/data frame (each containing the identifier) is sent from the initiator to the receiver (step 58).

The receiver receives the write command/data frame (step 60). The receiver checks for the control flag (step 62). If the control flag is not set (step 64), control moves to step 70, where the data frame is sent to cache. If the control flag is set (again, step 64), the receiver compares the identifier in the CDB with the identifier appended to the data frame (step 66). If a match is determined (step 68), the data frame is sent to cache (again, step 70), and good status is sent to the initiator (step 72). The method 50 then ends (again, step 74). If a match is not determined (again, step 68), then a SCSI Check Condition is returned to the initiator to indicate failure (step 76). The method 50 then ends (again, step 74).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for performing a data exchange between an initiator and a receiver in a fibre channel protocol (FCP), comprising:
    setting a control flag in a write command to indicate a presence of an identifier;
    copying the identifier into a command descriptor block (CDB) of the write command;
    appending the identifier to a data frame;
    sending the write command and data frame, each including the identifier, from the initiator to the receiver;
    receiving the write command and data frame, the write command and data frame each including the identifier; and
    determining if the control flag is present, thereby
    if the control flag is determined to be set, comparing the identifier in the CDB with the identifier appended to the data frame,
    wherein if the identifier in the CDB matches the identifier appended to the data frame, the data frame is sent to cache, along with a good status is returned to the initiator, and if the identifier in the CDB does not match the identifier appended to the data frame, a check condition is returned to the initiator to indicate failure.

2. The method of claim 1, wherein said sending the write command and data frame, including the identifier, from the initiator to the receiver is performed pursuant to a peer-to-peer redundant copy (PPRC) operation.

3. The method of claim 1, wherein the initiator and the receiver are cooperating entities, and copying the identifier into the CDB and appending the identifier to the data frame includes copying information known to the receiver into the CDB and appending the information known to the receiver to the data frame.

4. A system for performing a data exchange in a fibre channel protocol (FCP), comprising:
   an initiator controller in communication with a receiver controller;
   wherein the initiator controller comprises: setting a control flag in a write command to indicate a presence of an identifier, copying the identifier into a command descriptor block (CDB) of the write command, appending the identifier to a data frame, and sending the write command and data frame, each including the identifier, from the initiator to the receiver;
   wherein the receiver controller comprises receiving the write command and data frame, the write command and data frame each including the identifier, and determining if the control flag is present, such that
   if the control flag is determined to be set, comparing the identifier in the CDB with the identifier appended to the data frame,
   wherein if the identifier in the CDB matches the identifier appended to the data frame, the data frame is sent to cache, along with a good status is returned to the initiator, and if the identifier in the CDB does not match the identifier appended to the data frame, returning a check condition to the initiator controller to indicate failure.

5. The system of claim 4, wherein the initiator and receiver controllers comprise performing a peer-to-peer redundant copy (PPRC) operation.

6. The system of claim 4, wherein the initiator and the receiver are cooperating entities, and the identifier includes information known to the receiver controller.

7. The system of claim 4, wherein the identifier includes at least one of a logical block address (LBA), volume identification (volume ID), and track identification (track ID) information.

8. The system of claim 4, wherein the identifier is a counter.

9. A computer program product for performing a data exchange between an initiator and a receiver in a fibre channel protocol (FCP), the computer program product comprising a computer-readable storage medium having computer-readable program code portions stored therein, the computer-readable program code portions comprising:
   a first executable portion for setting a control flag in a write command to indicate a presence of an identifier;
   a second executable portion for copying the identifier into a command descriptor block (CDB) of the write command;
   a third executable portion for appending the identifier to a data frame;
   a fourth executable portion for sending the write command and data frame, each including the identifier, from the initiator to the receiver;
   a fifth executable portion for receiving the write command and data frame, each including the identifier;
   a sixth executable portion for determining if the control flag is present; and
   a seventh executable portion for, if the control flag is determined to be set, comparing the identifier in the CDB with the identifier appended to the data frame,
   wherein if the identifier in the CDB matches the identifier appended to the data frame, the data frame is sent to cache, along with a good status is returned to the initiator, and if the identifier in the CDB does not match the identifier appended to the data frame, a check condition is returned to the initiator to indicate failure.

10. The computer program product of claim 9, wherein the sending the write command and data frame, including the identifier, from the initiator to the receiver is performed pursuant to a peer-to-peer redundant copy (PPRC) operation.

11. The computer program product of claim 9, wherein the initiator and the receiver are cooperating entities, and copying the identifier into the CDB and appending the identifier to the data frame includes copying information known to the receiver into the CDB and appending the information known to the receiver to the data frame.

* * * * *